United States Patent [19]

Thiele

[11] Patent Number: 4,901,856
[45] Date of Patent: Feb. 20, 1990

[54] PACKING FOR RECORDING MEDIUM

[75] Inventor: Hartmut Thiele, Munich, Fed. Rep. of Germany

[73] Assignee: Agfa-Gevaert Aktiengesellshcaft, Leverkusen, Fed. Rep. of Germany

[21] Appl. No.: 121,104

[22] Filed: Nov. 16, 1987

[30] Foreign Application Priority Data

Nov. 29, 1986 [DE] Fed. Rep. of Germany ....... 8632020

[51] Int. Cl.$^4$ ............................................ B65D 85/672
[52] U.S. Cl. .................... 206/397; 206/415; 206/493; 242/118.61
[58] Field of Search ............... 206/303, 310, 312, 389, 206/397, 413, 415, 472, 477, 493; 242/68.3, 118.61

[56] References Cited

U.S. PATENT DOCUMENTS

| 2,525,415 | 10/1950 | Lenox | 242/118.61 |
| 3,229,811 | 1/1966 | Studwell | 242/118.61 |
| 3,233,728 | 2/1966 | Johnson et al. | 242/118.61 |
| 4,122,945 | 10/1978 | Borzak | 206/493 |
| 4,262,799 | 4/1981 | Perrett | 206/493 |
| 4,491,222 | 1/1985 | Gaccotta et al. | 206/413 |

FOREIGN PATENT DOCUMENTS

| 1944240 | 7/1978 | Fed. Rep. of Germany | 206/389 |
| 888860 | 2/1962 | United Kingdom | 206/389 |

Primary Examiner—David T. Fidei
Attorney, Agent, or Firm—Connolly and Hutz

[57] ABSTRACT

Described is a supporting hub for an internal slide, which accepts a spooled recording medium, where one side of the supporting hub lies against a ring-shaped supporting surface on the outside of the internal slide, where a reel hub carrying the recording medium or a flange spool can be pushed onto the other cylindrical side of the supporting hub and where the internal slide can be slid into a protective casing. The ring diameter of the supporting surface of the supporting hub lying against the inner side of the internal slide is here the same size or greater than the ring diameter of the supporting surface of the supporting hub lying against the outside of the internal slide. In a preferred embodiment, the supporting hub is in two parts which are detachable from the inside or the outside of the internal slide, and grasp one another.

4 Claims, 1 Drawing Sheet

PACKING FOR RECORDING MEDIUM

The invention relates to a supporting hub for an internal slide which contains a picture or sound recording medium in the form of a tape, wound onto a reel hub or a reel spool, and in which the internal slide is located in a protective casing.

BACKGROUND OF THE INVENTION

1. Field of the Invention

The term recording media as used herein refers to moving picture films or magnetic recording media, for example magnetic films or magnetic tapes.

2. Related Art

Magnetic tapes are are transported wound on flangeless reel hubs, for example according to DIN No. 45 515, DIN No. 66 109 or DE PS No. 24 48853 or on flange spools according to DIN No. 45 517. Studio magnetic tapes, which are sold in various lengths, are preferably spooled onto flangeless reel hubs, which are then inserted into a internal slide. The internal slide, which is generally made of card and whose side parts contain several unfolded flaps or brackets, as described in DE-GM No. 73 36 017, has a supporting hub in the middle, upon whose circumference the reel hub or the spool is pushed. In this manner the recording medium on the reel hub is fixed and protected against damage. For transport and archival purposes, the internal slider is located for its part inside a protective casing, for example in a sliding box, as is known from DE GM No. 85 09 846.

The cylindrically formed supporting hub is generally produced in one piece and is made of synthetic material, for example of polystyrol. At one end it has a side flange, which serves as a stop or a supporting surface when it is inserted from the outside of the internal slide into its central circular hole. At the point at which the supporting hub is inserted in the internal slide, a ring-shaped guiding reel can be provided in the supporting hub immediately next to the side flange. In the construction of the internal slide described, it often occurs that this hooks into the protective casing while it is being inserted, as the side flange of the supporting hub has no counter-supports on the inside of the internal slide and hence stands lofted from the card if this bends through, if only by a fraction, during gripping and inserting.

Hence the object was to find a supporting hub for the internal slide that does not display the disadvantage mentioned.

SUMMARY OF THE INVENTION

In accordance with the invention, the problem was solved by a supporting hub with the characteristic features mentioned in claim 1. Closer details of the invention arise from the claims given below, the description, and the drawings.

BRIEF DESCRIPTION OF THE DRAWINGS

The innovation will now be more closely explained by means of diagrams, among which

DESCRIPTION OF THE PREFERRED EMBODIMENT

Figure 1:
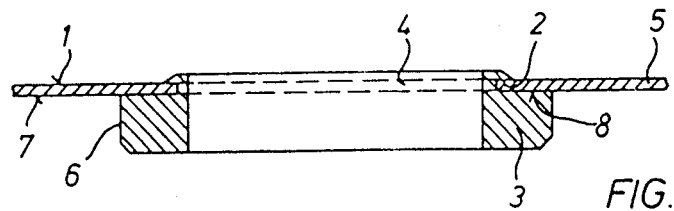
FIG. 1 shows a cross-section through a supporting hub for the internal slide according to the innovation

FIG. 1 shows the supporting hub (3) inserted into the central hole (4) of the internal slide (5). The (undrawn) reel hub of a recording medium is pushed onto the cylindrical outer surface (6) of the supporting hub (3). The essence of the innovation consists in that the supporting surface (2) of the supporting hub that lies against the outside (1) of the internal slide is the same size as or preferably smaller than the supporting surface (8) of the supporting hub that lies against the inner surface (7).

In this manner, as the inner supporting surface (8) impedes a curving up of the rims of the outer supporting surface (2) of the supporting hub, the hooking of the internal slide while being placed in the protective casing is effectively hindered, while the sloping down of the edge of the outer supporting surface (2) of the supporting hub known from the state of the art also helps.

Figure 2A:
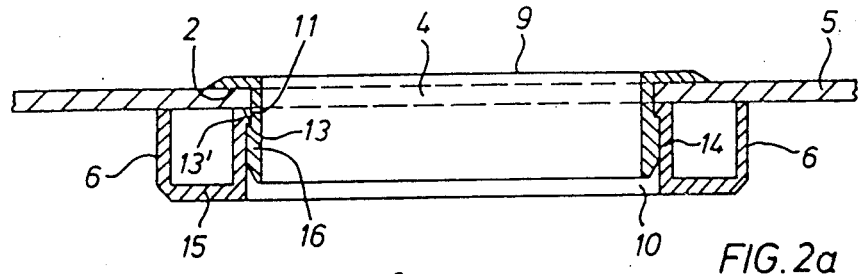
FIG. 2a shows a cross-section through an especially preferred embodiment of the supporting hub for the internal slide according to the innovation
Figure 2B:
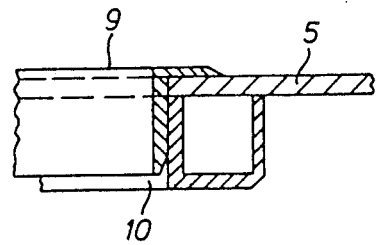
FIG. 2b shows a section of FIG. 2a with a different embodiment of the supporting hub according to the innovation
Figure 3:
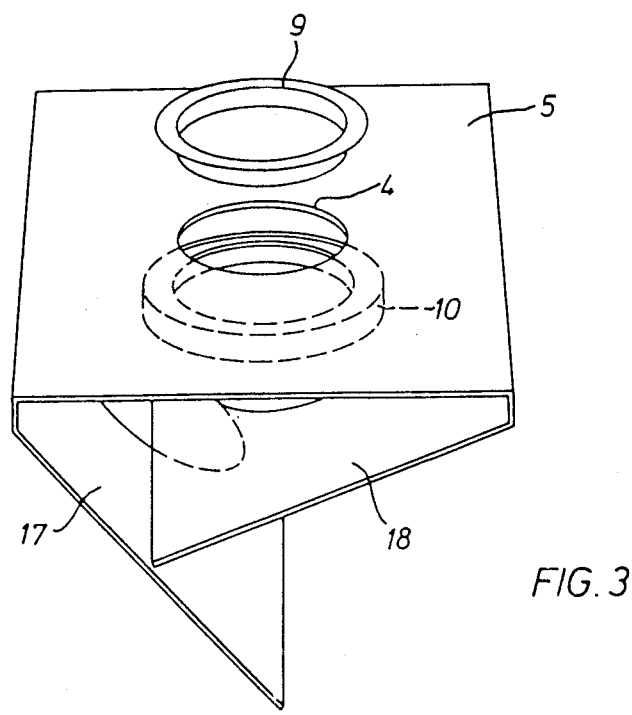
FIG. 3 shows a perspectival representation of a two-part supporting hub according to the innovation according to FIG. 2 together with internal slide with all its parts separated.

In a preferred embodiment of the invention, the supporting hub is executed in two parts, where, as may be recognized from FIG. 3, in each case one part of the outer or of the inner side of the internal slide is introduced, and inserted so as to engage. As is represented in FIG. 2a, the part (9) of the supporting hub to be introduced from the outside of the internal slide corresponds in some of its features to the state of the art described at the beginning. On the outside of the cylindrical wall (16) it contains a guiding groove (11) for the internal slide card, into whose hole (4) it is pushed, so that the supporting surface (2) lies against the outside of the internal slide. The double-walled cylinder (10), whose outer wall (6) and whose inner wall (14) are connected by a ring-shaped rib (15) and which lies against the inside of the internal slide at the open ends of both its walls, is placed from the inside of the internal slides. By means of complementary hooking elements (13, 13') which are formed in the shape of overhands both on the inner side of the wall (14) of the part (10) and on the outside of the wall (16) of the part (9), both parts engage and hold fast, and are practically immovably connected to each other. Both parts (9, 10) can also be glued or powerfully connected to each other, as is indicated in FIG. 2b.

The inner and outer wall of the double-walled cylinder (part 10) provide the counter-support for the supporting surface (2) of the part 9 of the supporting hub, and thereby impede the hooking of the internal slide while it is being pushed into the protective casing, not shown. As has already been described, the reel hub containing the recording medium is pushed onto the surface of circumference of the wall (6), and the reel hub is enveloped by the two sides 17 and 18 which being folded together envelop the hub in the internal slide, or center section, 5.

The two-part supporting hub, which may be produced extrordinarily simply by pouring or injection and can also be put together with ease, can of course be of another form than that represented in FIG. 2; for example, the space between the walls (6) and (14) can also be filled out, or the wall (14) of the part 10 can lie, engageably, against the inside of the wall (16) of the part 9.

In any case, the supporting hub according to the innovation enables comfortable handling of the internal slide during insertion into the protective casing.

I claim:

1. A support device for holding providing a protruberant hub centrally positioned in a flat member capable of sliding insertion comprising:
    a flat member having at least two folds to provide a central section and at least two side sections foldable inwardly to overlie an inner surface of the central section,
    a centrally positioned aperture formed in said central section of the flat member,
    a cylindrical hub consisting of a synthetic material secured in said aperture and comprised of
    a first part consisting of a ring having a peripheral flange extending from one edge
    a second part consisting of cylinder,
    said first and second parts dimensioned so that the outer diameter of the ring fits into engagement and engages with the inner diameter of the cylinder, and the flange extends radially equal to or less than the outer diameter of the cylinder,
    said flange lying against the outer surface of the central section of the flat member circumferentially around the aperture
    and the cylinder abuts inner surface of the flat member circumferentially of the aperture,
    whereby the outer diameter of a supporting surface of the cylinder lying against the inner surface of the central section is the same dimension or greater than the outer diameter of a supporting surface of the flange lying against the outer surface of the flat member.

2. A support device according to claim 1 wherein the two parts of the cylindrical hub are respectively pushed on the inner surface and the outer surface of the central section.

3. A device according to claim 1, characterised in that the second part on the outside of its cylindrical wall (16) has an over-hang (13), which engages in an overhang (13') provided on the inside of the cylindrical wall (14) of the first part.

4. A device according to claim 1, characterized in that the first and second parts are powerfully connected and/or glued to one another.

* * * * *